United States Patent [19]

Rodgers

[11] Patent Number: 4,989,403

[45] Date of Patent: Feb. 5, 1991

[54] SURGE PROTECTED GAS TURBINE ENGINE FOR PROVIDING VARIABLE BLEED AIR FLOW

[75] Inventor: Colin Rodgers, San Diego, Calif.

[73] Assignee: Sundstrand Corporation, Rockford, Ill.

[21] Appl. No.: 197,626

[22] Filed: May 23, 1988

[51] Int. Cl.$^5$ .............................................. F02C 7/057

[52] U.S. Cl. .................................... 60/39.07; 60/39.29

[58] Field of Search .................. 60/39.07, 39.23, 39.27, 60/39.29, 726; 415/26, 27, 28, 160, 163, 199.1

[56] References Cited

U.S. PATENT DOCUMENTS

| | | | |
|---|---|---|---|
| 2,625,009 | 11/1953 | Leggett et al. | 60/726 |
| 2,817,475 | 12/1957 | Moody | 415/160 |
| 3,659,417 | 5/1972 | Grieb | 60/39.183 |
| 3,853,433 | 12/1974 | Roberts et al. | 415/160 |
| 4,091,613 | 5/1978 | Young | 60/39.07 |
| 4,404,793 | 9/1983 | Coffinberry . | |
| 4,428,194 | 1/1984 | Stokes et al. . | |
| 4,550,561 | 11/1985 | Coffinberry . | |

OTHER PUBLICATIONS

Csanody, G. T. *Turbomachines* McGraw-Hill, 1964; pp. 15-17.

Treager, I. E. *Aircraft Gas Turbine Engine Technology* McGraw-Hill, 1970; p. 10.

*Primary Examiner*—Louis J. Casaregola
*Attorney, Agent, or Firm*—Wood, Phillips, Mason, Recktenwald & VanSanten

[57] ABSTRACT

Surge protection is achieved in a turbine engine intended to provide varying quantities of bleed air and having two compressor stages 48, 36 by providing the inlet 56 of the first stage 48 with variable inlet guide vanes 58, 60. The first stage compressor 48 is a high specific speed, single stage centrifugal compressor whose stable operating characteristics are highly sensitive to inlet guide vane geometry, thereby allowing variations in such geometry to be employed to prevent compressor surge.

1 Claim, 2 Drawing Sheets

SURGE PROTECTED GAS TURBINE ENGINE FOR PROVIDING VARIABLE BLEED AIR FLOW

FIELD OF THE INVENTION

This invention relates to a gas turbine, and more specifically, to a gas turbine that is utilized to provide a substantial quantity of bleed air to satisfy a varying demand therefor.

BACKGROUND OF THE INVENTION

Gas turbine engines are utilized for a large variety of purposes including propulsion by thrust, propulsion by mechanical coupling, driving accessories requiring a rotary input, providing compressed air, and combinations thereof. The compressed air provided is known as "bleed air" because it is bled from the turbine engine at some location following partial or total compression by a rotary or centrifugal compressor utilized in such engines. It may be utilized for a variety of purposes. For example, in an aircraft, it may be utilized for cabin ventilation, deicing, main engine starting, etc.

In any event, many of the uses to which bleed air is put are variable in the sense that quantity of bleed air required for a given use will vary over a period of time. At the same time, the demand for air to support combustion for operation of the turbine engine will remain essentially constant. As a consequence, a decrease in the demand for bleed air, without more, can result in so-called compressor surge or backflow that will occur because of the presence of a higher pressure in the combustor for the engine than in the diffuser for the combustor.

As is well known, this results in unstable operation of the turbine engine.

To avoid this problem, the prior art has resorted to the use of, for example, surge protection valves which are operable to open a flow path through which bleed air in excess of that demanded at a particular time may be dumped to prevent compressor surge. This method providing surge protection is satisfactory in preventing surge from occurring but requires that the turbine engine operate for a greater period of time at or near a full load condition. This relatively high loading on the engine reduces engine life and in addition, consumes unnecessarily large quantities of fuel.

The present invention is directed to overcoming one or more of the above problems.

SUMMARY OF THE INVENTION

It is the principal object of the invention to provide a new and improved surge protected, gas turbine engine that is well suited for providing a variable flow of bleed air without operation near or at full load conditions.

An exemplary embodiment of the invention achieves the foregoing object in a gas turbine including a turbine wheel rotatable about an axis and a combustor for producing hot gases of combustion. Means including a nozzle interconnect the combustor and the turbine wheel such that hot gases of combustion impinge upon the turbine wheel to drive the same about the axis.

A pair of rotary compressors are coupled to the turbine wheel to be driven thereby and each has an inlet and an outlet. They are connected in series to thereby define a first stage compressor and a second stage compressor. Means are provided to connect the second stage compressor outlet to the combustor to provide compressed air thereto and means are associated with at least the first stage compressor outlet for obtaining bleed air therefrom. Variable inlet guide means, normally in the form of vanes, are provided in the first stage inlet and are selectively movable between open, closed and intermediate positions. The first stage compressor is a high specific speed, single stage, centrifugal compressor which quite unexpectedly is highly sensitive to alterations in the geometry of the inlet guide means as far as its operation at varying flow rates and the dividing line between stable and unstable operation is concerned.

According to one embodiment of the invention, the rotary compressors and the turbine wheel are on a single shaft located on the axis.

In a highly preferred embodiment, the compressors are located on a cool side of the turbine wheel and the shaft extends to the turbine wheel from that cool side and is unsupported oppositely thereof.

According to one embodiment of the invention, the high specific speed is achieved by having the first stage inlet constructed and arranged such that air flow thereat during operation of the turbine will be at a speed approaching or greater than Mach 1.0 relative to the compressor vane tips first stage.

Viewed another way, the high specific speed ($N_s$) during operation is such as to exceed about 100 where $$N_s = \frac{N\sqrt{CFS}}{(H_{ad})^{.75}}$$

and N = rpm of the first stage compressor,

CFS = first stage compressor inlet volumetric flow in $ft^3$/sec, and $H_{ad}$ = adiabatic head in ft.

Other objects and advantages will become apparent from the following specification taken in connection with the accompanying drawings.

DESCRIPTION OF THE PREFERRED EMBODIMENT

Figure 1:
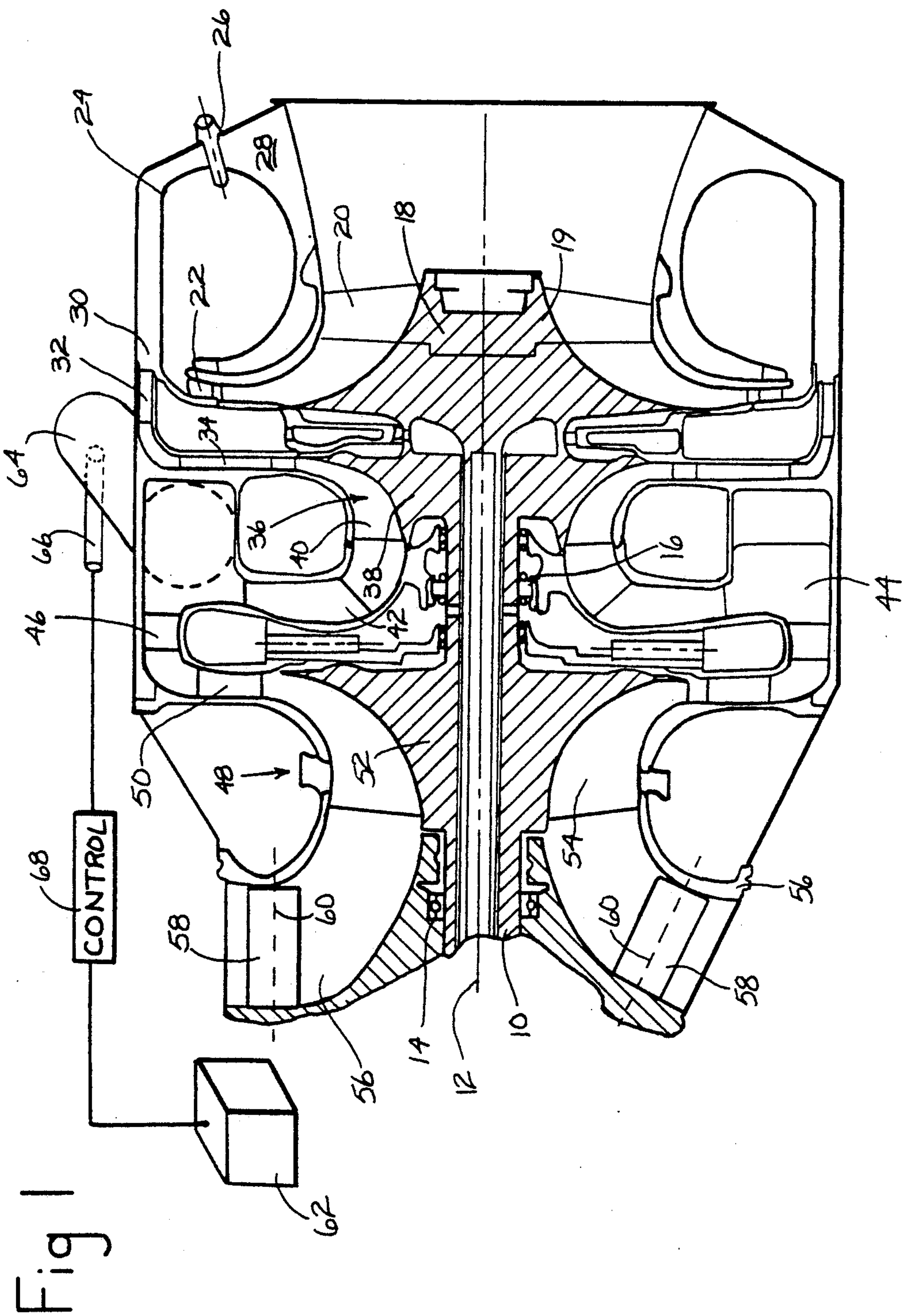
FIG. 1 is a sectional view of a gas turbine engine made according to the invention.

An exemplary embodiment of a gas turbine engine made according to the invention that is specifically designed for providing variable quantities of bleed air and which is protected against compressor surge is illustrated in FIG. 1. The same is seen to include a shaft 10 journalled for rotation about an axis 12 by a first set of bearings 14 and a second set of bearings 16 By the configuration illustrated, the shaft 10 is coupled to the hub 18 of a turbine wheel 19 provided with a series of vanes 20 of the radial inflow, axial outflow type. However, the invention may also find use in multiple stage, axial flow turbines as well.

An annular nozzle 22 is disposed about the radially outer periphery of the vanes 20 and is in fluid communication with an annular combustor 24. The combustor 24 is provided with fuel injectors 26 at desired locations and is surrounded on three sides by a compressed air plenum 28.

The plenum 28 includes an inlet area 30 occupied by deswirl vanes 32 which in turn is connected to a diffuser 34 for an axial inflow, radial discharge, centrifugal compressor, generally designated 36. The compressor 36 includes a hub 38 secured to the shaft 10 for rotation therewith as well as vanes 40.

The diffuser 34 serves as the outlet for the compressor 36 while fixed inlet guide vanes 42 serve as the inlet therefor. It is to be noted that the bearings 16 are located in between the inlet 42 and the outlet 34 for the compressor 36 and thus will be in a relatively cool area in relation to the temperatures that are present adjacent the turbine wheel as a result of receiving hot gases of combustion through the nozzle 22 from the combustor 24.

That is to say, the shaft 10 is unsupported on the hot side of the turbine wheel hub 18 to thereby avoid the need for bearings at that location which would be constantly subject to heat. This construction enhances the life of the turbine engine.

The inlet 42 of the compressor 36 joins to a plenum 44 which in turn is in fluid communication with deswirl vanes 46 arranged to receive compressed air from a rotary compressor, generally designated 48, having a diffuser 50 at its outlet.

The compressor 48 is also an axial inflow, radial discharge centrifugal compressor and includes a hub 52 integral with or secured to the shaft 10 along with vanes 54.

The compressor 48 includes an inlet 56 through which ambient air may be drawn to be compressed, first by the compressor 48, and then by the compressor 36 as a result of the serial connection of the two.

The inlet 56 is provided with a series of inlet guide vanes 58. According to the invention, the guide vanes 58 are variable inlet guide vanes, as is well known, may be mounted for rotation about respective axes shown schematically at 60. A motor or other type of actuator 62 may be utilized for rotating the guide vanes 58 on their respective axes 60 between opened and closed positions as well as intermediate positions, to open or close the inlet 56 as well as to partially open or close the inlet 56 when the vanes 58 are in intermediate positions.

The invention also includes a duct 64 extending from the plenum 44. The duct 64 provides a means of obtaining bleed air from the first stage compressor 48 and for directing it to some point of use. Associated with the duct 64 is a conventional sensor 66 which may be utilized to sense the flow rate in the duct 64 and provide a signal representative thereof to a controller 68 which in turn is utilized to operate the actuator 62. The arrangement is such that as the flow rate in the duct 64 decreases, indicating a decrease in the demand for bleed air, the actuator 62 will move the vanes 58 increasingly toward a closed position. Conversely, if an increase in demand for bleed air is detected, then the controller 68 acts through the actuator 62 to move the vanes 58 toward a more open position. The purpose is to prevent surge.

Of fundamental importance to the invention is the fact that the first stage compressor 48 is a high specific speed, single stage, centrifugal compressor. Quite unexpectedly, it has been discovered that the stable operating range of such a compressor is highly affected by changes in the inlet guide vane geometry. To provide a high specific speed compressor, the compressor 48 is designed so that during normal operating conditions, air flow speeds at the inlet 50 are approaching or in excess of Mach 1.0 relative to the vane tips of the first stage compressor 48.

Viewed another way, high specific speed ($N_s$) is one that exceeds 100, where $$N_s = \frac{N\sqrt{CFS}}{(H_{ad})^{.75}}$$

and

Figure 2:
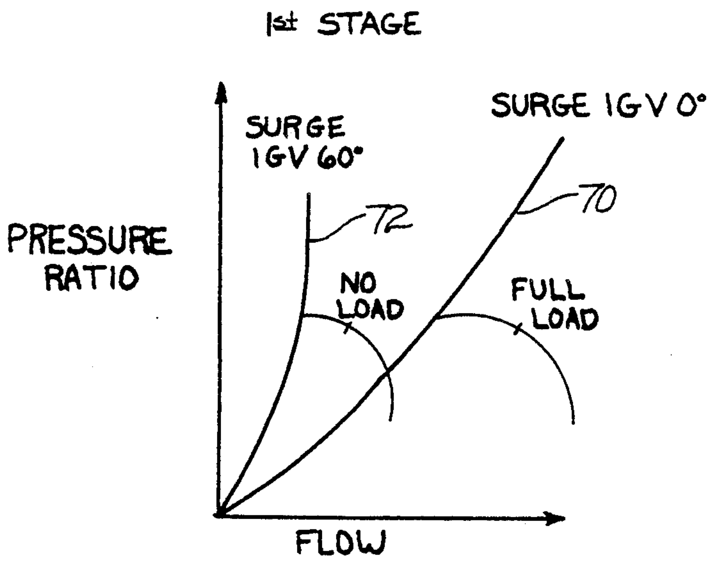
FIG. 2 is a graph of pressure ratio versus flow rate for the first stage of compression employed in the turbine.
Figure 3:
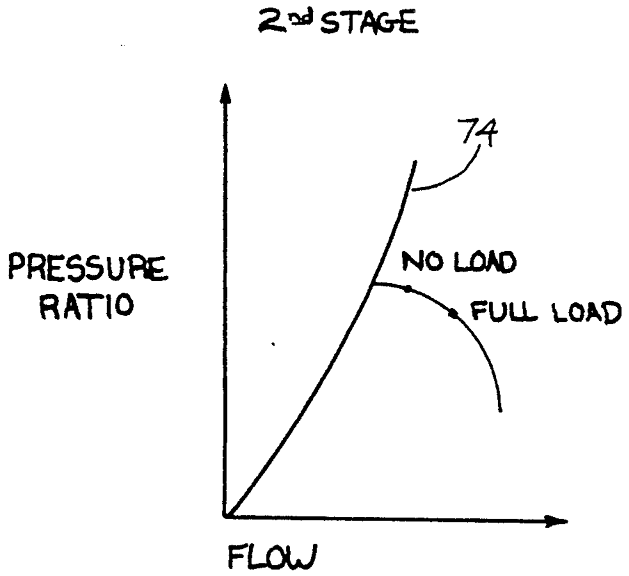
FIG. 3 is a graph similar to FIG. 2 but illustrating the relationship for the second stage of compression.

N=rpm of the first stage compressor,

CFS=first stage compressor inlet volumetric flow in $ft^3$/sec, and $H_{ad}$=adiabatic head in ft.

Where the two compressor stages 48 and 36 are matched as is known, operational characteristics are as shown in FIGS. 2 and 3. It will be noted that with the inlet guide vanes at zero degrees, i.e., the inlet 56 is wide open, the surge line 70, or line separating operational characteristics between stable and unstable operating conditions is substantially to the right of the no load point of operation. This would mean a situation where little or no bleed air was passing through the duct 64 because there was no demand for the same. The danger of surge is apparent.

However, the invention avoids that danger in such a situation by changing the inlet guide vane 58 from a zero degree position to a 60° position. The surge line then shifts from the initial line 70 to a new position shown by line 72 whereat the no load point is well on the stable side thereof. Thus, changing the geometry of the inlet guide vanes 58 in accordance with demand for bleed air allow operation of the engine without fear of compressor surge in the first stage.

FIG. 3 illustrates that while the no load point of operation of the second stage compressor 36 shifts in the direction of instability, it still remains well in the stable operation area to the right of the surge line 74.

Because of the ability to operate on the stable side of the surge lines simply by varying the inlet guide vane geometry, the turbine need be fueled only as required to meet the actual demand. Consequently, fuel consumption is reduced as is engine loading.

Thus, an engine made according to the invention is able to provide surge protection without wasteful dumping of excess bleed air and/or operation near or at full load conditions.

I claim:

1. A surge protected gas turbine engine for providing a variable flow of bleed air without operation near full load condition, comprising:

a radial inflow, axial outflow turbine wheel rotatable about an axis;

an annular combustor located about said axis for producing hot gases of combustion;

means, including an annular nozzle, connected to said combustor and disposed about said turbine wheel such that hot gases of combustion impinge upon the turbine wheel to drive the same about said axis;

a pair of radial inflow, axial outflow, centrifugal compressors coupled to said turbine wheel to be driven thereby, said rotary compressors each having an inlet and an outlet being connected in series to thereby define a first stage compressor and a second stage compressor, said first stage compressor being a single stage, centrifugal compressor having a high specific speed ($N_s$ in excess of about 100) where $$N_s = \frac{N\sqrt{CFS}}{(H_{ad})^{.75}}$$

and

N=rpm of the first stage compressor,

CFS=first stage compressor inlet volumetric flow in $ft^3$/sec, and $H_{ad}$=adiabatic head in ft., said second stage compressor further being back to back with said turbine wheel;

means connecting said second stage compressor outlet to said combustor to provide compressed air thereto;

means associated with at least said first stage compressor outlet for obtaining bleed air therefrom;

variable inlet guide vanes for said first stage inlet and selectively movable between open, closed and intermediate positions;

a sensor in said bleed air obtaining means; and means responsive to said sensor for moving said guide vanes toward said closed position as bleed air flow decreases, and toward said open position as bleed air flow increases.

* * * * *